United States Patent [19]

Bates et al.

[11] Patent Number: 4,647,912
[45] Date of Patent: Mar. 3, 1987

[54] COUPLING DISCRIMINATOR AND INTERFACE ADAPTOR

[75] Inventors: Roger D. Bates, Hillsboro; Merlin R. Miller, Aloha, both of Oreg.

[73] Assignee: Tektronix, Inc., Beaverton, Oreg.

[21] Appl. No.: 811,621

[22] Filed: Dec. 20, 1985

[51] Int. Cl.$^4$ .................. H04Q 1/00; H04L 23/00
[52] U.S. Cl. .................. 340/825.5; 340/825.06; 375/36; 178/69 R; 370/79
[58] Field of Search .......... 340/825.52, 825.5, 825.06; 375/36, 121; 370/17, 71, 72, 79; 307/494, 350; 328/149; 178/69 R; 179/2 DP, 2 C; 333/24, 18, 17 M

[56] References Cited

U.S. PATENT DOCUMENTS

| 4,479,228 | 10/1984 | Crane | 375/36 |
| 4,512,025 | 4/1985 | Frankel et al. | 375/36 |
| 4,534,038 | 8/1985 | Dodds et al. | 375/36 |
| 4,573,168 | 2/1986 | Henze et al. | 375/36 |

Primary Examiner—Donald J. Yusko
Attorney, Agent, or Firm—John P. Dellett; Robert S. Hulse

[57] ABSTRACT

A coupling discriminator for Ethernet standard local area network interface equipment monitors the electrical characteristics of an incoming differential signal pair, discriminates between a signal pair that is direct coupled and a pair that is transformer coupled, and configures the interface equipment for operation with the type of coupling detected.

6 Claims, 4 Drawing Figures

COUPLING DISCRIMINATOR AND INTERFACE ADAPTOR

BACKGROUND OF THE INVENTION

This invention relates to a communications system, and more particularly to a local area network (LAN), and a discriminator for detecting the type of coupling utilized in signal driver circuits supplying signals between a station and the LAN.

Stations of a LAN may include interactive workstations such as personal computers and word processors, as well as passive devices comprising data stores, printers, video display terminals, etc., all of which can have substantial data processing capabilities. Current trends are toward sharing data among these stations, not only for implementing data and document communication and distributed processing applications, but also to allow workstations to share the more expensive system components, viz.: those having mechanical elements and/or moving media such as printers and secondary disk storage devices.

Local area networks comprise data communications systems which interconnect computers, peripherals, video display terminals and other devices dispersed over a limited geographical area, e.g., within a building or throughout a cluster of buildings. LANs typically transfer data at rates in the range of 1-10 million bits per second. However, the numbers are arbitrary, and the boundary between the high end of a LAN and the low end of a large topology network is determined more by the data rate and organization of the network than by its geographical dispersion. Local networks are generally characterized by inexpensive transmission media and modems, but high data rates compared with those of the traditional voice-grade telephone system. Transmission media most commonly used in LANs are coaxial cable and twisted-pair wiring.

Research and development of local area networks began in the early 1970s, but industry standards for LANs and LAN equipment are only now being developed by standards groups such as the European Computer Manufacturers Association (ECMA), the Institute of Electrical and Electronic Engineers (IEEE), and various industry groups. Consequently, there are a variety of system approaches to LANs, and more than 250 vendors of networks and network components. Some of the vendors offer open systems allowing interconnection of products from more than one vendor, while others provide closed systems which makes it difficult to connect various types of equipment to the system. Therefore, interface components, which connect stations to the LAN, may not be compatible with a particular LAN system. Incompatibilities between system components are usually resolved by providing multiple circuits in the interface equipment, one for each operating configuration, requiring strapping options for manually selecting the proper circuit. The use of such strapping options necessitates determination of the system or interface configuration by a technically qualified person and then the strap must be installed or changed manually. It is desirable that stations such as personal computers, data terminals, etc., be connectable to a LAN system without the assistance of technical personnel.

It is therefore an object of the invention to provide an improved interface circuit for local area network equipment.

It is another object of the invention to provide an improved coupling discriminator for an interface transceiver in a local area network.

It is another object of the invention to provide an improved coupling discriminator in an Ethernet local area network.

SUMMARY OF THE INVENTION

In accordance with the present invention, a local area network transceiver is provided with a discriminator having an input circuit connected to a pair of signal leads on which a differential signal is impressed. The discriminator element senses the electrical characteristics of the incoming differential signal, detects whether the signal is direct or transformer coupled, and provides an output signal which switches signal drivers and receivers to correspond with the type of coupling detected.

DRAWINGS

While the invention is set forth with particularity in the appended claims, other objects, features, the organization and method of operation of the invention will become more apparent, and the invention will best be understood, by referring to the following detailed description in conjunction with the accompanying drawings in which:

DESCRIPTION OF THE PREFERRED EMBODIMENT

Figure 1:
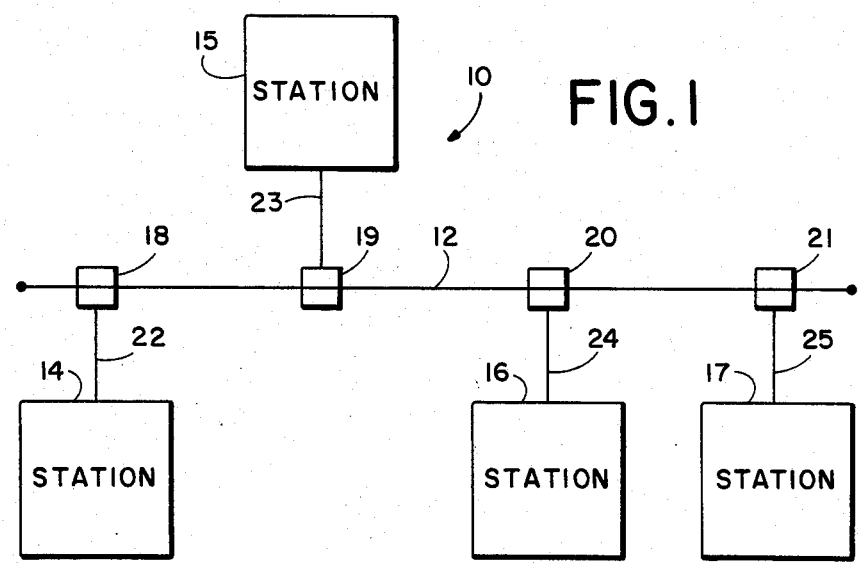
FIG. 1 is a block diagram of a local area network.

Referring now to the drawing for a more detailed description of the construction, operation and other features of the instant invention by characters of reference, FIG. 1 illustrates a local area network segment 10 comprising a coaxial cable bus 12 interconnecting a plurality of geographically dispersed stations 14-17. Digital data packets are coupled to and from the coaxial cable 12 by a corresponding plurality of transceivers 18-21 which serve as cable taps. The stations 14-17 are connected to the transceivers 18-21 by transceiver cables 22-25 which may be up to 50 meters in length. Each transceiver cable 22-25 suitably includes four twisted wiring pairs carrying receive data, transmit data, collision presence, and power for operating the transceiver.

The LAN segment illustrated exemplifies a well known random access discipline for bus systems called carrier-sense multiple access with collision detection (CSMA/CD). Under a CSMA protocol, a station ready to transmit monitors the coaxial cable 12 for the presence of a signal in order to detect transmission attempts already in progress from another station. If transmission from another station is already in progress, the first station defers transmitting until the end of the current transmission. However, because of finite propagation delays on the bus, two or more stations can attempt to transmit almost simultaneously, the signals will interfere with each other, and a socalled collision results. The transceivers 18-21 determine the presence of such collisions by monitoring the average signal level of the cable 12. When a collision is detected, the transmission attempts are aborted and each station reschedules its transmission by determining a random retransmission interval.

When a user connects a station such as the station 14 to a LAN, the transceiver or tap 18 may not be compatible with the station. For example, one well known LAN system, Ethernet, utilizes a tap having DC coupled signal drivers, while a similar system developed under an IEEE 802.3 standard for local area networks utilizes AC coupled signal drivers. Standard interface equipment is supplied commercially in both configurations, and it is not obvious to the station end user which type of interface equipment is installed. The user who connects a station to the LAN through a transceiver having the wrong type of drivers can experience intermittent, unstable operation of the system.

Figure 2A:
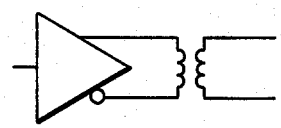
FIG. 2 is a schematic diagram of a coupling discriminator in accordance with the invention.
Figure 2B:
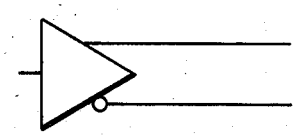
Figure 2:
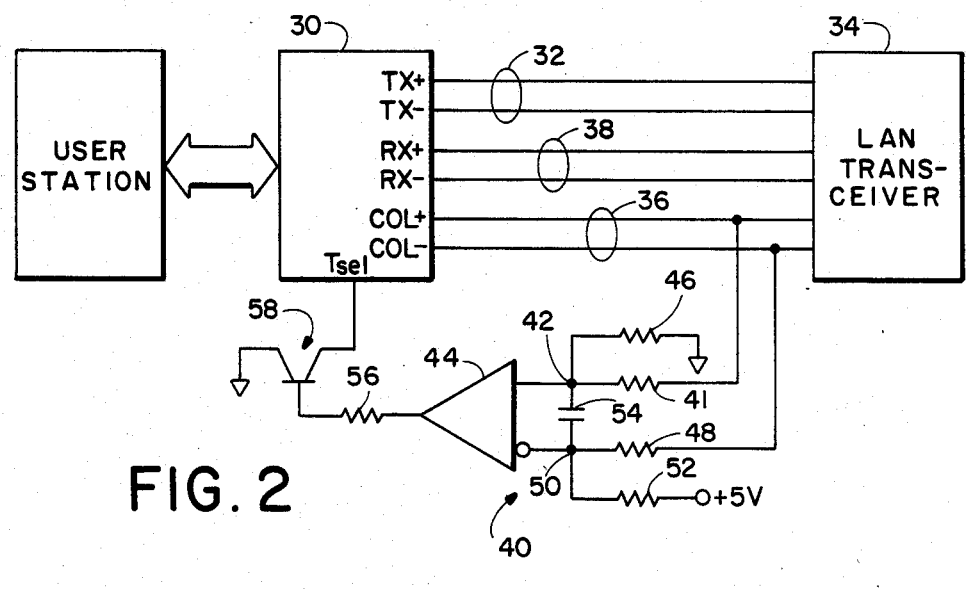

Referring to FIG. 2, a LAN device controller includes a serial interface adapter circuit 30 (conventionally part of the station) generating a differential transmit signal TX+/TX− on a twisted-pair transmission line 32 which is coupled to a LAN transceiver or tap 34. The serial interface adapter 30 receives a collision signal COL+/COL−, and a receive signal RX+/RX−, from the LAN tap 34 by way of twisted pair transmission lines 36, 38. The serial interface adapter 30 is suitably a model number AM7991A integrated circuit manufactured by Advanced Microdevices Corporation.

The collision signal transmission line 36 is monitored by a coupling discriminator circuit 40 according to the present invention, wherein the COL+ signal is connected through a resistor 41 (suitably 470 ohms) to non-inverting input terminal 42 of an operational amplifier 44 configured as a differential signal comparator. Terminal 42 is further returned to ground through resistor 46 suitably having a value of 6000 ohms. The COL− signal is connected through another 470 ohm resistor 48 to terminal 50 comprising an inverting input of comparator 44, the latter being connected through a resistor 52 (6000 ohms) to a positive five volt supply. A 0.1 microfarad capacitor 54 is coupled between the terminals 42, 50. The output of comparator 44 is connected through a resistor 56 (4700 ohms) to the base of a transistor 58, which may be a type 2N3904, while the emitter of the transistor is connected to a Tsel input of the serial interface adaptor circuit 30. The comparator circuit 44 may comprise a model 26LS32 integrated circuit manufactured by Advanced Microdevices Corporation.

Referring to FIGS. 2a and 2b, the incoming COL signal is generated in the transceiver or tap 34, a commercially available Ethernet standard interface component, either by a transformer coupled driver circuit (FIG. 2a) or a direct coupled driver circuit (FIG. 2b). In a CSMA/CD system, the differential signal COL+/COL− is inactive or at a steady state about 99% of the time, and consequently a signal from the transformer coupled driver circuit (FIG. 2a) will then collapse to zero volts due to transformer action. At this time the resistor network 41, 46, 48, 52 biases the comparator 44 inputs such that the output of the comparator 44 goes low for indicating transformer coupling in the tap 34. That is, terminal 50 is coupled to a positive voltage via resistor 52, and terminal 42 is coupled to ground through resistor 46. If the COL+/COL− signal is received from the direct coupled driver (FIG. 2b), then a +/− steady state differential voltage is input to terminal 42/50 of the comparator 44 and the comparator output signal goes high, indicating direct coupling in the tap 34. The capacitor 54 holds the input signals of the comparator 44 reasonably fixed during short periods when the COL+/COL− signal is active.

The comparator circuit 44 thus acts as a coupling discriminator generating an output signal which is coupled as the Tsel signal to the serial interface adapter 30. The Tsel signal input to the serial interface adapter 30 configures that circuit to receive and transmit signals by way of the twisted pair transmission lines 32, 36, 38 that are compatible with either DC or AC coupling as thus determined, thereby eliminating the need to manually determine transceiver configuration and install strapping options at the Tsel terminal.

While the principles of the invention have now been made clear in the foregoing illustrative embodiment, there will be immediately obvious to those skilled in the art many modifications of structure, arrangement, proportions, the elements, and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

We claim:

1. A data communication system comprising:
   a communicating medium;
   a device generating and receiving data and connectable to said communicating medium through selectable interface circuits;
   means for coupling said device to said communicating medium, said coupling means including driver means;
   means in said device for detecting signal coupling characteristics of said driver means; and
   means for enabling interface circuits in said device compatible with signal coupling characteristics of said driver means.

2. The data communication system of claim 1 wherein said detecting means comprises a comparator circuit which discriminates between a DC coupled signal and an AC coupled signal.

3. In an CSMA/CD local area data communication network having a plurality of devices connected for communication through a corresponding plurality of transceivers coupling the devices to a communicating medium, a method of configuring a device for operation with a transceiver having unknown coupling characteristics comprising the steps of:
   monitoring a differential collision signal coupled to the device;
   detecting from the monitored collision signal whether a transceiver utilizes a direct coupled driver circuit or a transformer coupled driver circuit; and
   configuring the device to operate with the type of driver circuit detected.

4. A data communication system having a user device connected for communication with other devices by way of a communicating medium, each of the user devices being coupled to the communicating medium through a corresponding transceiver, the transceivers having drivers which may be either direct coupled or transformer coupled, wherein the improvement comprises:
   circuit means in the device for sensing coupling characteristics of a transceiver to which the device is connected; and means responsive to the sensing means for selecting device interface circuits compatible with the coupling characteristics detected of the transceiver.

5. The data communication system of claim 4, wherein the sensing means comprises a comparator circuit having inputs connected to a differential signal representing collision data.

6. The data communication system of claim 5 wherein said comparator circuit comprises a differential amplifier having inverting and non-inverting inputs connected to receive said differential signal for providing a first differential amplifier output level in response to a steady state d.c. differential signal, and means for biasing said inverting and non-inverting inputs for producing a second differential amplifier output level in the absence of a steady state d.c. differential signal.

* * * * *